US007844291B2

United States Patent
Sung et al.

(10) Patent No.: US 7,844,291 B2
(45) Date of Patent: Nov. 30, 2010

(54) METHOD FOR TRANSFERRING AND APPLYING FLOOR CONTROL SCHEME IN POC SESSION AND SYSTEM FOR IMPLEMENTING THE SAME

(75) Inventors: Sang-Kyung Sung, Seoul (KR); Ji-Hye Lee, Seoul (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 681 days.

(21) Appl. No.: 11/775,683

(22) Filed: Jul. 10, 2007

(65) Prior Publication Data
US 2008/0009281 A1    Jan. 10, 2008

(30) Foreign Application Priority Data
Jul. 10, 2006    (KR)    ...... 10-2006-0064642

(51) Int. Cl.
H04B 7/00    (2006.01)
(52) U.S. Cl. ........... 455/518; 455/519; 455/420; 455/90.3
(58) Field of Classification Search .......... 455/518, 455/519, 426.1, 90.2, 507, 412.2, 414.1, 455/420, 552.1, 556.1, 3.04, 422.1; 370/349, 370/270, 395.2, 437; 709/205, 201
See application file for complete search history.

(56) References Cited

U.S. PATENT DOCUMENTS

| 2004/0174830 | A1  | 9/2004  | Koskelainen et al. |
| 2005/0124365 | A1  | 6/2005  | Balasuriya et al. |
| 2005/0190740 | A1* | 9/2005  | Zhao et al. ............... 370/349 |
| 2006/0040685 | A1* | 2/2006  | Kwon ...................... 455/507 |
| 2006/0084455 | A1* | 4/2006  | Schwagmann et al. ...... 455/518 |
| 2006/0126635 | A1  | 6/2006  | Alberth, Jr. et al. |
| 2008/0155106 | A1* | 6/2008  | Hans et al. ............... 709/227 |
| 2008/0248826 | A1* | 10/2008 | Holm ...................... 455/518 |

FOREIGN PATENT DOCUMENTS

KR    102005011147    11/2005

* cited by examiner

*Primary Examiner*—Tan Trinh
(74) *Attorney, Agent, or Firm*—The Farrell Law Firm, LLP

(57) ABSTRACT

Disclosed is a method and system for transferring and applying a floor control scheme when a Push-To-Talk (PTT) over Cellular (PoC) session is established between PoC clients supporting various types of floor control schemes (e.g., media burst control schemes). According the method and system, when a PoC client providing Open Mobile Alliance PoC multimedia communication service supports a plurality of floor control schemes and there is no floor control scheme appointed to be supported in a session, a floor control scheme requested by a PoC session establisher is transferred through a PoC session establishment procedure and is applied to the session.

34 Claims, 7 Drawing Sheets

```
INVITE sip:conf_fact_uri@domain.com SIP/2.0
Via: SIP/2.0/TCP client_apc.domain.com;branch=z9hG4bK776sgdkse
Max-Forwards: 70
From: sip:client_a@domain.com;tag=49583
To: Conf Fact <conf_fact_uri@domain.com>
Call-ID: asd88asd77a1234
CSeq: 78 INVITE
Require: recipient-list-invite
Priv-Answer-Mode: manual, require
Conten-Type: multipart/mixed;boundary="boundary1"
Content-Length: ...

--boundary
Content-Type: application/sdp
m=application 22000 udp MBCP
a=fmtp:MBCP queuing=1;tb_granted=1;mbcs=round-robin
  --boundary
  ...
  --boundary1
Content-Type: application/resource-lists+xml
Content-Disposition: recipient-list
        <?xml version="1.0" encoding="UTF-8"?>
        <resource-lists xmlns="urn:ietf:params:xml:ns:resource-lists"
              xmlns:xsi="http://www.w3.org/2001/XMLSchema-instance">
        <list>
                <entry uri="sip:john@example.tmo.com" />
                <entry uri="sip:bill@example.tmo.com" />
                <entry uri="sip:stephane@example.tmo.net" />
                <entry uri="sip:mark@example.tmo.com" />
        </list>
        </resource-lists>
  --boundary1
```

METHOD FOR TRANSFERRING AND APPLYING FLOOR CONTROL SCHEME IN POC SESSION AND SYSTEM FOR IMPLEMENTING THE SAME

PRIORITY

This application claims priority under 35 U.S.C. 119(a) to an application entitled "Method For Transferring And Applying Floor Control Scheme In PoC Session And System For Implementing The Same" filed in the Korean Intellectual Property Office on Jul. 10, 2006 and assigned Serial No. 2006-64642, the contents of which are incorporated herein by reference.

BACKGROUND OF THE INVENTION

1. Field of the Invention

The present invention relates to a method for transferring and applying a floor control scheme when a Push-To-Talk Over Cellular (PoC) session is established between PoC clients supporting various types of floor control schemes (e.g., media burst control schemes), and a User Equipment (UE) and network system for implementing the same.

2. Description of the Related Art

Significant developments in mobile communication technology and the expansion of communication networks have led to the provision of various services and applications which use mobile telephones. In addition to the basic communication service, users are demanding more diversified services, including a positioning service, a multimedia service and a Push To Talk (PTT) service. Particularly, the PTT service supports various supplementary functions such as instant messenger and status display, as well as group and voice communication which have been provided by conventional radio transmitters or Trunked Radio Systems (TRSs).

Various efforts are being made in the industry to standardize a PoC service employing such a PTT function in a mobile communication network. One feature of the PoC service, which draws a distinction between the PoC service and the conventional mobile communication service, is that a user can perform communication while moving between sessions, if necessary, because he/she belongs to a plurality of sessions. The requirement that a user must be able to communicate while moving among a plurality of PoC sessions, that is, the requirement for a multi-session function, is specified in the Open Mobile Alliance (OMA) which is an organization regulating pertinent mobile communication services.

Meanwhile, the PoC V2.0 system supports a PoC multimedia communication service. To this end, the PoC V2.0 system defines new types of multimedia such as video, audio and text, in addition to voice. The current PoC system can display a multi-stream (e.g., video or image) due to the performance improvement of user equipments.

Also, in the PoC V2.0 system, various floor control schemes (e.g., media burst control schemes) are specified in order to support further expanded PoC service, so that it is possible for a PoC server or PoC client to initiate a PoC session and to control a floor therein according to one of a plurality of floor control schemes.

However, since the conventional PoC technology reflects only the case in which a plurality of floor control schemes are included in the documents for definitions by a PoC group such as the pre-arranged group, there is currently no method for applying a specified floor control scheme with respect to a randomly-created PoC session, such as a one-to-one session or an ad-hoc session group. Also, even in a pre-arranged group, the conventional PoC technology does not provide a detailed method for transferring a floor control scheme determined based on the group definition document thereof to a corresponding client.

SUMMARY OF THE INVENTION

Accordingly, the present invention has been made to solve the above-mentioned problems occurring in the prior art, and disclosed in the present invention are a method and system for providing a specific floor control scheme desired by a PoC session initiator, among various floor control schemes supported by a PoC client, to a PoC server through a floor control scheme transmission or negotiation procedure upon establishing a PoC session, so as to apply the specific floor control scheme.

The present invention provides a method and system for transferring a floor control scheme to be used in a PoC session to receiving-side PoC clients participating in the PoC session, before actually applying the floor control scheme.

The present invention provides a method and system for selectively cooperating with an XML Document Management (XDM) system or directly transferring a floor control scheme in order to transfer and apply the floor control scheme through a PoC session negotiation.

The present invention provides a method and system, in which a PoC client, which will establish a PoC session, can acquire an IDentity (ID) corresponding to a floor control scheme (e.g., media burst control scheme) desired to be applied to the PoC session by the PoC client through cooperation with a PoC Extensible Markup Language (XML) Document Management Client (XDMC), and the PoC client can transfer a session participation request message including the ID to a PoC server, when cooperating with the XDM system in order to transfer and apply the floor control scheme through a PoC session negotiation.

The present invention provides a method and system, in which a PoC server can query a XML Document Management Server (XDMS) on a floor control scheme ID included in a received session participation request message so as to apply the floor control scheme corresponding to the ID to a corresponding session, insert the floor control scheme into the session participation request message, and then transfer the session participation request message.

The present invention provides a method and system, in which a PoC client can transfer details of a specific floor control scheme desired by a PoC session initiator to a PoC server by inserting the details of the specific floor control scheme into a session participation request message, and the PoC server can transfer the session participation request message including the specific floor control scheme to a receiving-side PoC server, when directly transferring the floor control scheme when transferring and applying the floor control scheme through a PoC session negotiation.

The present invention provides a method and system for notifying a receiving-side PoC client of a floor control scheme defined in documents of a pre-arranged group when the defined floor control scheme has been determined by a PoC server, so that the method of transferring the floor control scheme to each client can be applied in the same manner even when the floor control scheme is included in group information.

In accordance with an aspect of the present invention, there is provided a system for transferring and applying a floor control scheme in a PoC session, the system including a session initiation request PoC client for transmitting a session participation request message including a floor control scheme to be used in a PoC session when the PoC session is established, a PoC server for applying the floor control scheme included in the session participation request message to the PoC session when the PoC server has received the session participation request message, and transferring the session participation request message including the floor control scheme to a receiving-side PoC client, and the receiving-side PoC client for determining whether to accept the floor control scheme included in the session participation request message when the receiving-side PoC client has received the session participation request message from the PoC server, and transmitting a response message according to acceptance or rejection of the floor control scheme to the PoC server.

In accordance with an aspect of the present invention, there is provided a system for transferring and applying a floor control scheme in a PoC session, the system including a session initiation request PoC UE for identifying a preset floor control scheme ID corresponding to a floor control scheme to be used in a PoC session and transmitting a session participation request message including the identified floor control scheme ID, when the PoC session is established, a PoC server for identifying the floor control scheme corresponding to the floor control scheme ID included in the session participation request message when the PoC server has received the session participation request message, applying the floor control scheme to the PoC session to be established, and transferring the session participation request message including the floor control scheme to a receiving-side PoC client, and the receiving-side PoC client for determining whether to accept the floor control scheme included in the session participation request message when the receiving-side PoC client has received the session participation request message from the PoC server, and transmitting a response message according to acceptance or rejection of the floor control scheme to the PoC server.

In accordance with an aspect of the present invention, there is provided a system for transferring and applying a floor control scheme in a PoC session, the system including a session initiation request PoC UE for identifying an ID preset for a floor control scheme to be used in a PoC session and transmitting a session participation request message including the identified floor control scheme ID, when the PoC session is established, a PoC server for identifying the floor control scheme corresponding to the floor control scheme ID included in the session participation request message when the PoC server has received the session participation request message, storing the floor control scheme ID and identified floor control scheme, inserting a parameter representing that the identified floor control scheme is offered into the session participation request message, and transferring the session participation request message to a receiving-side PoC client, and the receiving-side PoC client for determining whether to accept the floor control scheme included in the session participation request message when the receiving-side PoC client has received the session participation request message from the PoC server, and transmitting a response message according to acceptance or rejection of the floor control scheme to the PoC server.

In accordance with an aspect of the present invention, there is provided a method for transferring and applying a floor control scheme in a PoC session, the method including transmitting, by a session initiation request PoC client, a session participation request message including a floor control scheme to be used in a PoC session, when the PoC session is established, applying, by a PoC server, the floor control scheme included in the session participation request message to the PoC session when the PoC server has received the session participation request message, and transferring the session participation request message including the floor control scheme to a receiving-side PoC client, and determining, by the receiving-side PoC client, whether to accept the floor control scheme included in the session participation request message when the receiving-side PoC client has received the session participation request message from the PoC server, and transmitting a response message according to acceptance or rejection of the floor control scheme to the PoC server.

In accordance with an aspect of the present invention, there is provided a method for transferring and applying a floor control scheme in a PoC session, the method including identifying, by a session initiation request PoC UE, a preset floor control scheme ID corresponding to a floor control scheme to be used in a PoC session and transmitting a session participation request message including the identified floor control scheme ID, when the PoC session is established, identifying, by a PoC server, the floor control scheme corresponding to the floor control scheme ID included in the session participation request message when the PoC server has received the session participation request message, applying the floor control scheme to the PoC session to be established, and transferring the session participation request message including the floor control scheme to a receiving-side PoC client, and determining, by the receiving-side PoC client, whether to accept the floor control scheme included in the session participation request message when the receiving-side PoC client has received the session participation request message from the PoC server, and transmitting a response message according to acceptance or rejection of the floor control scheme to the PoC server.

In accordance with an aspect of the present invention, there is provided a method for transferring and applying a floor control scheme in a PoC session, the method including identifying, by a session initiation request PoC UE, an ID preset for a floor control scheme to be used in a PoC session and transmitting a session participation request message including the identified floor control scheme ID, when the PoC session is established, identifying, by a PoC server, the floor control scheme corresponding to the floor control scheme ID included in the session participation request message when the PoC server has received the session participation request message, storing the floor control scheme ID and identified floor control scheme, inserting a parameter representing that the identified floor control scheme is offered into the session participation request message, and transferring the session participation request message to a receiving-side PoC client, and determining, by the receiving-side PoC client, whether to accept the floor control scheme included in the session participation request message when the receiving-side PoC client has received the session participation request message from the PoC server, and transmitting a response message according to acceptance or rejection of the floor control scheme to the PoC server.

The present invention further includes storing a floor control scheme list in a PoC XDMC and a XDMS and managing the floor control scheme list (e.g., creating and updating a new floor control scheme), and matching a floor control scheme with a floor control scheme ID.

In addition, the present invention discloses a floor control scheme application method using a principle of session negotiation, including storing, by a PoC server, a floor control scheme transferred when a PoC session is established, and applying the floor control scheme when a successful response is received, in addition to the aforementioned construction.

The present invention provides a method for transferring and applying a floor control scheme, which is requested by a PoC session establisher, through floor control scheme negotiation, when a session participation PoC client supports a plurality of floor control schemes under a multimedia PoC environment and there is no supported floor control scheme appointed in a session, such as an ad-hoc group session. In addition, the present invention provides a method for transferring a floor control scheme, when the floor control scheme is determined by group information, as in a pre-arranged group.

BRIEF DESCRIPTION OF THE DRAWINGS

The above and other aspects, features and advantages of the present invention will be more apparent from the following detailed description taken in conjunction with the accompanying drawings, in which:

FIG. 6 illustrates a detailed format of an INVITE message for transferring a floor control scheme through SIP signaling according to the present invention.

DETAILED DESCRIPTION OF THE PREFERRED EMBODIMENTS

Hereinafter, preferred embodiments of the present invention will be described with reference to the accompanying drawings. In the following description, a detailed description of known functions and configurations incorporated herein will be omitted for the sake of clarity and conciseness.

Figure 1:
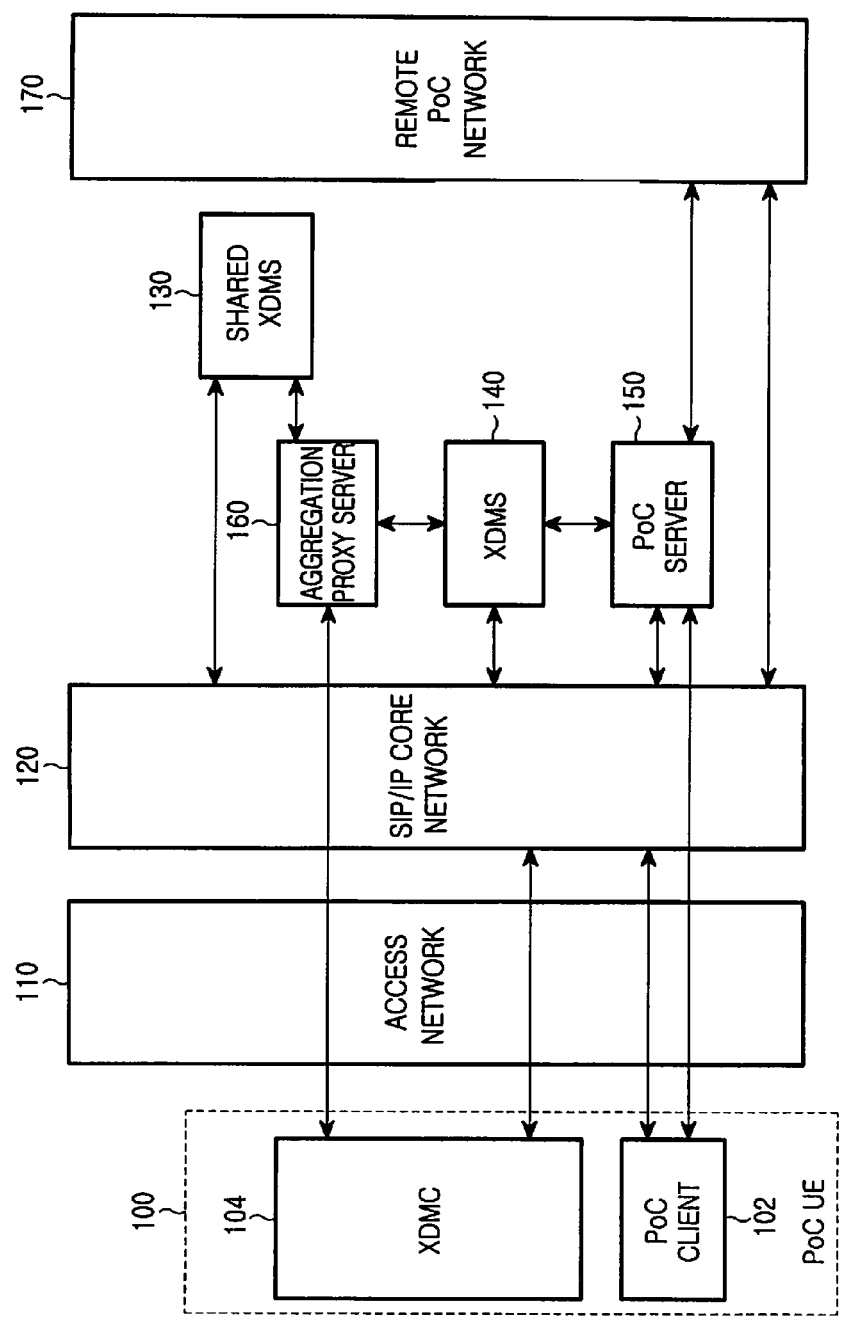
FIG. 1 illustrates the construction of a conventional PoC service system.

First, a PoC system to which the present invention is applied will now be described with reference to FIGS. 1 to 3. The following description will be given with respect to an example in which the present invention is applied to a PTT system, particularly to a PoC system which provides a PTT service through a cellular mobile communication network. Generally, a PoC system uses an SIP and an SIP extension protocol in order to transfer session participation information for group communication, and uses an XML Configuration Access Protocol (XCAP) in order to acquire group information. The following embodiment of the present invention may be implemented with the aforementioned protocols, and the basic construction of the present invention may be based on the PoC Rel. 1 system. FIG. 1 illustrates the construction of a conventional PoC service system and a relative network.

The conventional PoC system includes a PoC UE 100, XDMSs 130 and 140 and a PoC server 150. In addition, the PoC system may further include an aggregation proxy server 160. The aforementioned components may be connected to each other through an access network 110, an SIP/IP core network 120 and a remote PoC network 170.

The PoC UE 100 may include a PoC client 102 and an XDMC 104.

The PoC client 102, which represents a service requester contained in the PoC UE 100, resides in the PoC UE 100 and performs a network access so as to provide a PoC service subscriber with a PoC service. The PoC service subscriber may be provided with a PoC service through the PoC UE equipped with the PoC client. In the following description, the "PoC client" will be used as the general term for the PoC service subscriber and the UE equipped with a PoC client. Also, the reference numeral of the PoC client will be omitted unless a specific distinction is required.

The PoC client is mainly used to enable a PoC service subscriber (i.e. PoC user) to establish a PoC session, participate in or terminate an established session. The PoC client also has functions for creating and transmitting a talk burst, supporting an instant personal alert and authenticating an access to a PoC service. The PoC client is connected to the SIP/IP core network 120, which supports SIP/IP multimedia, through the access network 110.

The PoC client is connected to the SIP/IP core network 120, which importantly supports SIP/IP multimedia services, via the access network 110. The SIP/IP core network 120 is connected to the PoC server 150 and the XDMSs 130 and 140 so as to support the PoC service. In this case, the PoC server 150 can perform a controlling PoC function for maintaining and managing a PoC session, and perform a participating PoC function for participating in a PoC session established for a point-to-point communication or a multipoint communication.

Meanwhile, a PoC service is accompanied with a group session establishment service, such as a conference communication. To this end, the OMA standard defines the XDMSs 130 and 140 and the XDMC 104 for a group list service. FIG. 1 shows a XDMS 140 used for a PoC service and a shared XDMS 130 compatible with other service enablers. Information about a group and a group member may be input into the XDMSs 130 and 140 through the PoC client. From a list of individuals or groups received from the XDMSs 130 and 140, the PoC client obtains information regarding other PoC clients it can call. Meanwhile, creation, modification and management of groups and group members in the XDMSs 130 and 140 may be conducted via a communication network, which can be relied on by PoC service providers, such as the Internet or Intranet. Further description of protocols for managing XML documents (e.g. creation, modification and removal of group lists) will be omitted for the sake of clarity.

For a group service, upon receiving a group list-related request from the XDMC 104, the aggregation proxy server 160 routes the request to the XDMSs 130 and 140 according to rules.

The PoC server 150 will now be described.

Figure 2:
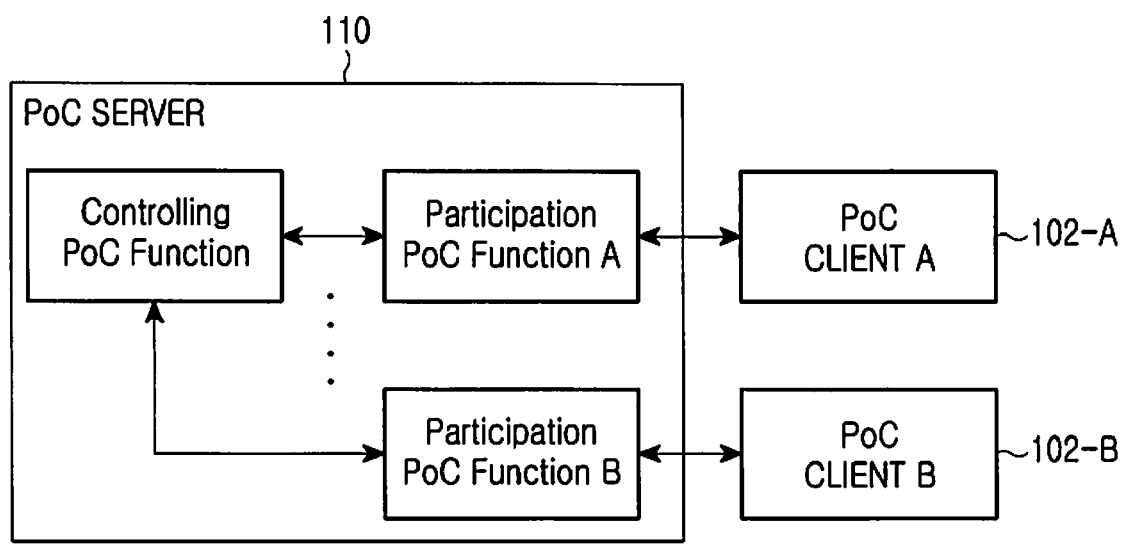
FIG. 2 is a block diagram illustrating the construction of a conventional PoC server.
Figure 3:
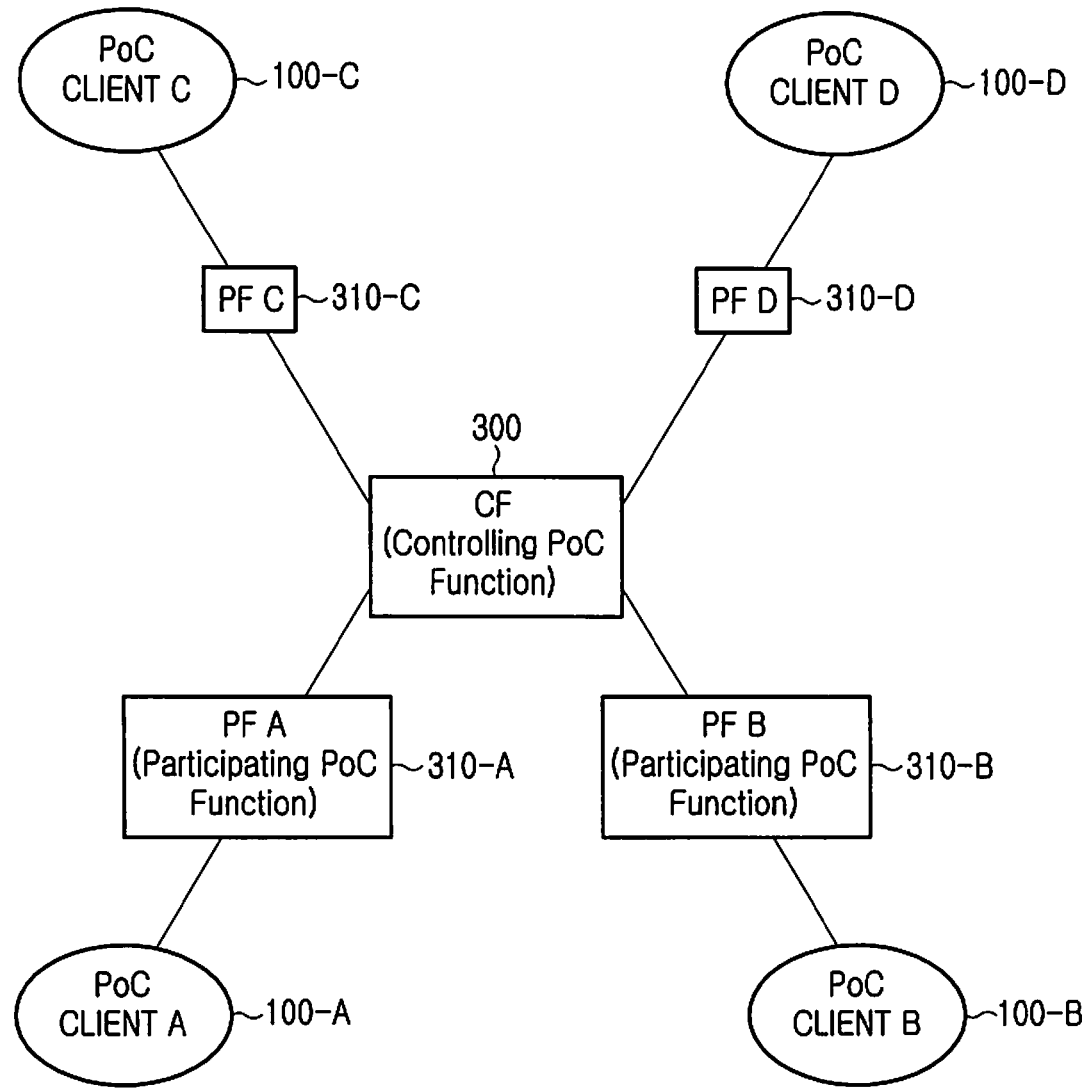
FIG. 3 is a block diagram illustrating the construction of a controlling PoC function (CF) unit and a participating PoC function (PF) unit in a PoC server.

FIG. 2 is a block diagram illustrating the construction of a conventional PoC server.

The functions of the PoC server may be classified into a controlling PoC function (CF) for generally maintaining and managing PoC sessions and a participating PoC function (PF) for handling maintenance and management for each PoC session. The characteristics according to each function of the PoC server will now be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized charging reports
May provide transcoding between different codecs
Support Talk Burst Control Protocol Negotiation Among the functions of the PoC server, the CF refers to the overall management of PoC sessions, as shown in Table 1. Particularly, the CF handles PoC clients' requests for a floor, decides an order in which to give the clients the floor, and gives the clients the floor in that order. Also, the CF distributes a talk burst from a specific PoC client to the other PoC clients participating in a group PoC call, and provides information about the PoC clients participating in the group PoC call.

As shown in Table 2 below, the PF is related to the management of sessions connected between the CF and each PoC client during a PoC session. Particularly, the PF relays a PoC client's request for the floor, and a grant of a floor to the PoC client by the CF. The PF performs a media relay function between the CF and the PoC client, and a transcoding function when the CF and the PoC client use different codecs When a talk burst is generated in a session while another talk burst is occurring in simultaneous sessions, the PF performs a filtering function for filtering one of the bursts according to the choice of the user.

TABLE 2

Participating PoC Function (PF)

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 is a block diagram illustrating the CF unit and PF unit of a PoC server.

PoC clients 100-A to 100-D are connected to a CF 300 through PFs 310-A to 310-D and establish PoC sessions. Thereafter, media corresponding to a corresponding talk burst of a PoC client that has been granted the floor from the CF 300, are sent to the other PoC clients. In this case, the PoC client that has the floor cannot output a talk burst before having checked information regarding PoC clients participating in the group session.

Meanwhile, call processing technology for communication connection in a PoC system may have various procedures depending on requirements and statuses of transmitting and receiving sides. Characteristics of a PoC system required according to the setup of the transmitting and receiving sides, based on the Open Mobile Alliance (OMA), are as follows:

First, the receiving side can establish its own response mode according to the request of the PoC client, in which the response mode may be classified into an automatic-answer mode and a manual response mode. In the auto-answer mode, when the transmitting side is included in a PoC client list preset by the receiving side, a response is directly sent to the transmitting side by a corresponding network, instead of the receiving side's manual response. This is done since the PoC server has a function to store information regarding the response mode and the corresponding user list in accordance with a response mode setup request of the UE. Meanwhile, the manual response mode is performed when the transmitting side is not included in the auto-answer user list, when it is unclear if the transmitting side is included in the auto-answer user list, or when the receiving side establishes a manual response mode to every user. In the manual response mode, a PoC communication request is transmitted to the UE through the reception network and the call is connected after the PoC client's permission.

Second, the PoC system may have an on-demand session mode and a pre-established session mode according to whether it is to be connected with a PoC server within the home network of the PoC user. In the pre-established session mode, a session is pre-established by the PoC client between the PoC client and the PoC server belonging to the user's home network, according to the request of the PoC client. Such a pre-established session is necessary to negotiate media parameters to be used by a PoC client with the PoC server in advance so that a session can be rapidly established without renegotiation for the media parameters to be used between the PoC server and the client in the future.

In order to establish a pre-established session, a PoC client employs an SIP INVITE method so as to provide media parameters supported by the PoC client, media parameters provided by the server, and a response to the media parameters provided by the server, through a Session Description Protocol Multipurpose Internet Mail Extensions (SDP MIME) body. Upon receiving a response message from the server, the response message is sent together with identification information, e.g., a conference Uniform Resource Identifier (URI), of a newly pre-established session, to the PoC client.

When such a pre-established session is used, it is possible to negotiate in advance an IP address, a port number, a codec to be used, a media type and a talk burst control protocol. The on-demand session mode corresponds to when no pre-established session has been established by any PoC client. Thus, the PoC client performs a procedure for connecting a PoC call after receiving an invitation message from another PoC client.

A setup of a response mode for the communication request in the PoC system can be stored in both a PoC server, which is a network element, and the PoC client, which is a UE.

When a response mode is established in a home network managing a PoC client, the response mode is realized in the PoC server having the PF within the home network to which the PoC client belongs.

When the response mode has been established in the network, the PF immediately and automatically responds to another PoC server's request for PoC communication by transmitting a session progress message to the network which has requested communication. Therefore, when the auto-answer mode has been established, the call request procedure is simplified, as compared to when a response is transmitted after the session setup message is transferred to the PoC client, thereby reducing the initial time period required for granting the floor.

However, when the response is automatically performed in the network, a result other than a user's response can occur. Therefore, a response mode can be set up even in the PoC client. In this case, the response mode of the PoC client has a higher priority than the response mode set up on the network. This is performed for the purpose of avoiding a privacy problem occurring when a PoC client modifies its response mode and requests the PoC server to update the response mode, but the response mode is not updated in real time due to signal delay or error in the network.

In summary, although the user's response mode for the PoC service can be set up in both the PoC server and PoC client, a response mode is determined by the PoC client in which the latest user's intention has been reflected, and a stream of media (e.g., actual user's voice and images) is transferred based on the determination.

A procedure for establishing a PoC multimedia session in the aforementioned PoC system will now be described.

A transmitting-side PoC client requests a call processing by transmitting a multimedia invitation message (e.g., audio, video and various texts) by means of an SIP protocol. In response to such a call processing request, a receiving-side client performs various response procedures depending on a response mode set up in the corresponding PoC server and on whether a pre-established session has been established. The call processing procedure for PoC communication will now be described by using a single network for both the transmitting and receiving sides.

A transmitting-side PoC client sends an SIP INVITE request including SIP address information of a receiving-side PoC client, with whom the transmitting-side PoC client desires to communicate, to a corresponding SIP/IP core network. In this case, an SIP INVITE message may further include elements such as PoC address information of the transmitting-side PoC client, required media parameters and characteristic value information identifying a PoC service. Herein, the "required media parameters" may include a plurality of characteristic values, such as an encoding method regarding audio and video, a rate, and a payload type, when the required session is related to multimedia.

The SIP INVITE message is transferred to a participating PoC server via corresponding IMS servers (i.e., a Proxy-Call Server Control Function (P-CSCF) and a Serving-Call Server Control Function (S-CSCF)) in the IMS network, based on a path query in a Dynamic Host Configuration Protocol (DHCP) server or a Domain Name Server (DNS). When a normal communication is requested, a participating PoC server, to which a PoC client is connected, can be realized separately from a controlling PoC server managing a talk burst of an established session, so that the SIP INVITE request sent to the PF server is transferred to the CF server via the SIP/IP core network of a corresponding network.

Meanwhile, a PoC session controlling network including a CF transfers an SIP INVITE request message to the receiving-side network, and then receives a response message from the receiving-side network. The SIP message responding from the receiving-side network may be a 1xx provisional response message, a 2xx successful response message, or one of 4XX to 6XX error response messages, depending on setup of the PF and the receiving-side PoC client. In the auto-answer mode, an SIP 183 Session Progress signal may be received as an response message, through which a connection between the PoC server and the client can take place in an IMS network of a communication requester. As a communication permission signal of the reception-side PoC client, an SIP 183 Session Progress or SIP 200 OK response is transmitted to the PoC client via CF and PF PoC servers. Upon receiving the 200 OK response or 183 Session Progress signal from the receiving-side PoC server, the CF confirms that the PoC call has been connected, and transmits a Floor Granted signal to the transmitting-side PoC client so as to grant the floor for a talk burst. The response, i.e., granting the floor for a talk burst according to the SIP 200 OK or 183 Session Progress signal, may be identified by using "confirmed" or "unconfirmed." According to an embodiment of the present invention, when the CF receives the "unconfirmed" response, it requires a buffering function.

Meanwhile, after receiving a response signal to the SIP INVITE request signal, the transmitting-side PoC client receives a Floor Granted signal to transfer a talk burst transmission permission signal (e.g., ring back tone) through a Real Time Control Protocol (RTCP). The Floor Granted signal is created by the CF having a talk burst mediation right, and transmitted to the PoC client through the PF managing the corresponding PoC client. Since the Floor Granted signal uses a bearer path instead of the SIP protocol, the Floor Granted signal can be transmitted without passing through an SIP/IP core network such as the IMS. The PoC client who confirmed the ring back tone transfers a stream of media (e.g., voice) using a Real-Time Transport Protocol (RTP).

The following description will be given with respect to a method and system in which, when a PoC client performing OMA PoC multimedia communication service establishes a PoC session in a PoC system constructed as above, a floor control scheme desired to be used in the PoC session is transferred to a receiving-side PoC client through a PoC server, and the PoC server can apply a floor control scheme obtained through negotiation to the PoC session.

Hereinafter, according to the present invention, a method and system for, when a PoC client establishes a PoC session in a PoC system, transferring a floor control scheme desired to be used in the PoC session, and enabling the PoC server to apply a floor control scheme obtained through negotiation to the PoC session will be described in detail.

Figure 4:
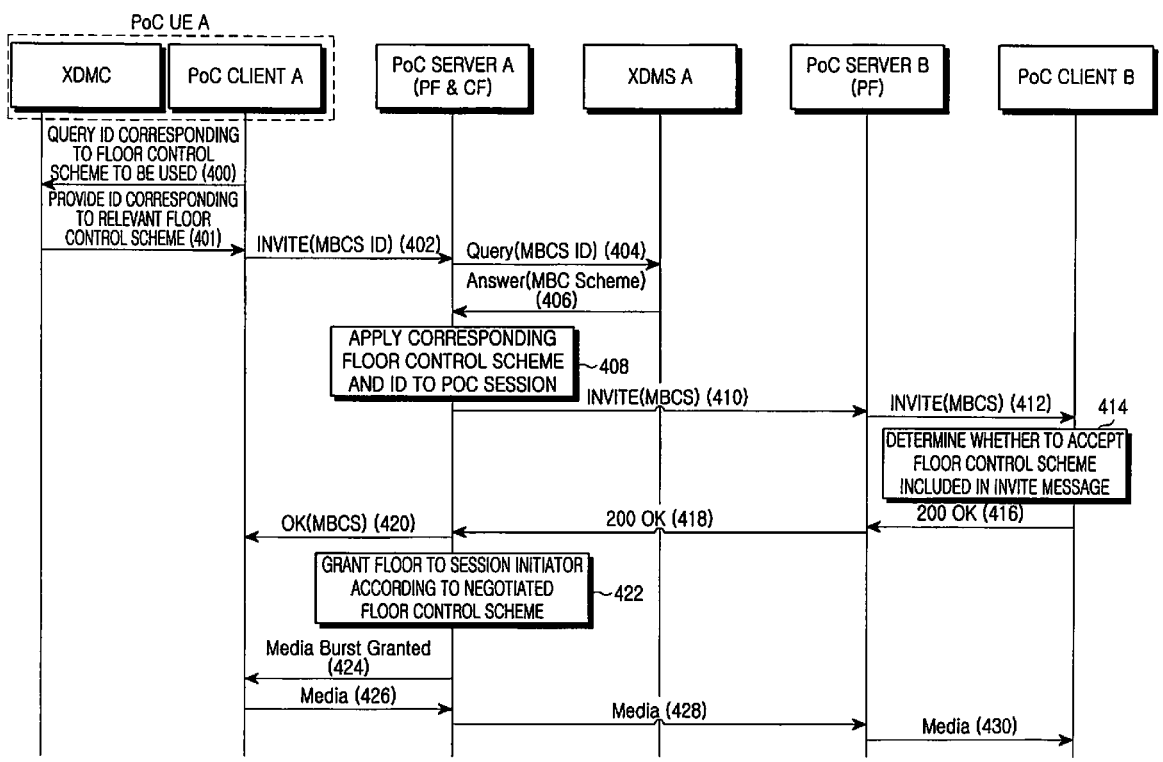
FIG. 4 illustrates the signal flow between a PoC client and a PoC server for establishing a session through a floor control scheme negotiation when a PoC UE establishes the session according to the present invention.

FIG. 4 illustrates the signal flow between PoC clients and a PoC server for establishing a PoC session by using a session participation request message including a floor control scheme when a PoC client establishes the PoC session according to the present invention. While FIG. 4 shows a method of cooperating with an XDMS, a method of directly transferring a floor control scheme will also be described with reference to selected steps in FIG. 4.

In step 400, a PoC client A, which will establish a multimedia PoC session, queries an XDMC on a floor control scheme to be used in the PoC session by using an internal interface of the PoC client A. The XDMC provides a floor control scheme ID corresponding to the floor control scheme to the PoC client A in step 401. Then, the PoC client A receives the floor control scheme ID corresponding to the floor control scheme from the XDMC in step 401. In this case, the PoC client A pre-establishes at least one floor control scheme and pre-stores a floor control scheme ID corresponding to each floor control scheme. Also, the stored floor control scheme and the floor control scheme ID corresponding to the scheme are shared with an XDMS. An XDM-document production and management technology for sharing information regarding floor control schemes between the XDMC and the XDMS will be described later with reference to FIG. 5.

Meanwhile, when receiving the floor control scheme ID corresponding to the floor control scheme to be used from the XDMC, the PoC client A transfers the floor control scheme ID to a PoC server A by inserting the floor control scheme ID into a session participation request message in step 402. When a session participation request message includes a floor control scheme ID in FIG. 4, an ID (i.e., a unique tag value in PoC service) collected in advance from the XDMC is transmitted as an MBCS parameter value in FIG. 6, is converted into an actual MBCS value in the conference server, and is then transmitted to a receiving-side network. MBCS ID included in a message transmitted in steps 402 and 404 is an MBCS parameter value and includes an ID value.

Thereafter, the PoC server A determines whether the PoC client A has been permitted to request a floor control scheme, and when it is permitted, the PoC server A queries a XDMS on the floor control scheme corresponding to the floor control scheme ID in step 404. Then, in step 406, the XDMS provides the PoC server A with a stored floor control scheme corresponding to the floor control scheme ID. That is, through steps 404 and 406, the PoC server A obtains a detailed floor control scheme corresponding to a floor control scheme ID. Thereafter, when receiving a response, which contains the floor control scheme corresponding to the floor control scheme ID, from the XDMS, the PoC server A applies the floor control scheme and ID thereof to the PoC session in step 408, and transfers a session participation request message including the floor control scheme to a receiving-side PoC server B in step 410 in order to notify the receiving-side PoC server B of the floor control scheme. Then, the receiving-side PoC server B transfers the session participation request message to a receiving-side PoC client B in step 412. Thus, MBCS included in a message transmitted in step 410 is converted into an actual MBCS value.

Thereafter, the receiving-side PoC client B, having received the session participation request message including the floor control scheme, determines whether to accept the floor control scheme included in the session participation request message based on the determination of the PoC user in step 414, and sends a final response message to the receiving-side PoC server B. In steps 416 and 418, a 200 OK response message may be regarded as a message representing that the receiving-side PoC client B applies the floor control scheme provided by the PoC client A in the corresponding PoC session.

When receiving a response message through steps 416 and 418, the PoC server A transmits a final response message including a floor control scheme to be applied to the PoC session to the PoC client A in step 420, thereby completing the establishment of the multimedia PoC session.

After completing the PoC session establishment, the PoC server A may grant a floor either to the session initiator or to a different user in the corresponding PoC session based on the negotiated floor control scheme in step 422, so that a corresponding PoC client can transmit media in the PoC session. Steps 424 to 430 show a procedure in which the PoC server A grants the floor to the PoC client A based on the floor control scheme and the PoC client A transmits media to the receiving-side PoC client B.

According to another embodiment of the present invention, a floor control scheme may be transmitted directly to a receiving-side PoC client without cooperation with an XDM system. In this case, a session participation request message including the floor control scheme is transmitted in step 402 of FIG. 4, and the PoC server A applies the floor control scheme after receiving the session participation request message. Therefore, query and response steps (such as steps 400 and 401) for an ID corresponding to a floor control scheme between the PoC client and the XDMC, and cooperation steps (such as steps 404 and 406) between the PoC server and the XDMS are unnecessary in this embodiment.

FIG. 6 illustrates a detailed example of a session participation request message (INVITE message) which includes a specific floor control scheme requested by a session initiator, as described with reference to FIG. 4.

The body of the INVITE message contains "application/sdp" that represents a parameter of media and URI list information included in an ad-hoc group session. In this case, a field value of an "Media Burst Control Scheme (mbcs)" parameter may be established in a format parameter section for "MBCP" application media, which is used to set up a floor control protocol, so that a PoC client initiating a session can transfer a floor control scheme desired to be applied in an ad-hoc PoC session to a corresponding PoC server. For example, a "round-robin" may be established in the media format parameter "mbcs," as shown in FIG. 6, so as to request the PoC server to control the floor in a round robin scheme. Meanwhile, a conference management PoC server may transmit a floor control scheme to a receiving-side PoC server and PoC client by using the same media format parameter as that described above, and a floor control scheme determined by the conference management PoC server may be transferred to a session initiator through a response message, such as a 200 OK message.

Meanwhile, when a session participation request message includes a floor control scheme ID in FIG. 4, an ID (i.e., a unique tag value in PoC service) collected in advance from the XDMC is transmitted as an "mbcs" parameter value in FIG. 6, is converted into an actual mbcs value in the conference server, and is then transmitted to a receiving-side network.

Hereinafter, a pre-processing technology required for applying a floor control scheme in a PoC session in cooperation with an XDMS will be described with reference to FIG. 5.

Figure 5:
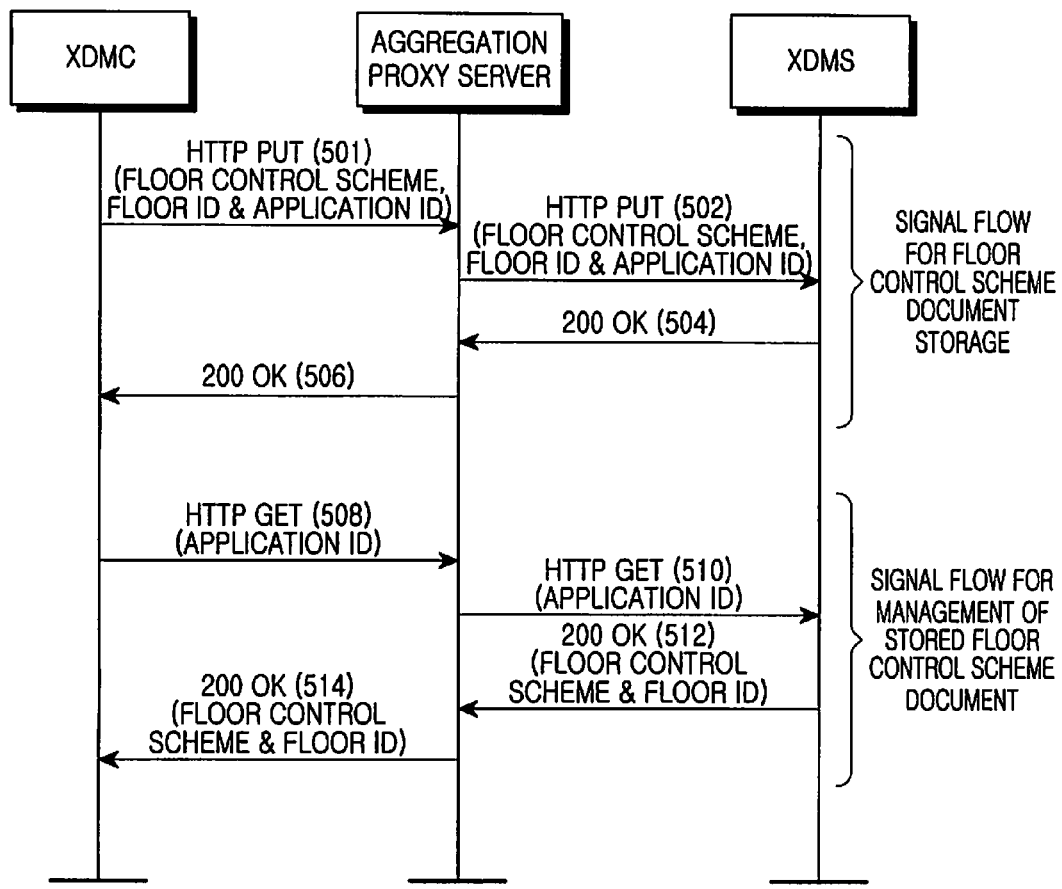
FIG. 5 illustrates the signal flow between PoC XDMC and XDMS servers for storing and managing a floor control scheme according to the present invention.

FIG. 5 shows the flow of signals between a PoC XDMC and a XDMS for storing and managing a floor control scheme. The PoC XDMC refers to a logical entity, which exists in a PoC UE together with a PoC client, as shown in FIG. 1. The PoC XDMC can transmit/receive information to/from the PoC client through an interface included in the PoC UE.

As shown in FIG. 5, a PoC user can compose a new floor control scheme document in the form of an XML document by utilizing the function of the PoC XDMC. In this case, a composed XML document includes a list of floor control schemes to be applied to a temporary PoC session, such as an ad-hoc group or one-to-one session, scheme IDs and an Application Unique ID (application ID) representing that the composed document refers to floor control schemes. In steps 500 and 502, the PoC XDMC transfers an XML document, which includes a list of floor control schemes, scheme IDs and an Application Unique ID, through an aggregation proxy server to the XDMS, by means of an HTTP PUT message. The XDMS, having received the XML document, stores the received floor control scheme document, and transfers a response message to the PoC XDMC through steps 504 and 506.

The floor control scheme document stored in the XDMS can be read by the PoC UE as requested by the user in the future, and then, it is possible to receive a floor control scheme and scheme ID according to an application ID. Steps 508 through 514 illustrate signal flows between PoC XDMC and XDMS in order to control PoC session floor control scheme stored in XDMS. At first, the PoC XDMC transmits an HTTP GET message including an application ID to the XDMS through steps 508 and 510. The XDMS, having received the message, transmits a response message (200 OK message) including floor control scheme and scheme ID corresponding to the application ID in steps 512 and 514.

According to another embodiment of the present invention, a floor control scheme desired to be used by a PoC session initiator may be applied through a negotiation procedure including a session request and response. In this case, the PoC server cannot apply a floor control scheme before receiving a successful response message to the floor control scheme from a receiving-side PoC client.

A method for applying a floor control scheme through a negotiation procedure including a session request and response will now be described with reference to FIG. 7.

First, in steps 700, 701, 702, 704 and 706, the same operations as those performed in steps 400, 401, 402, 404 and 406 of FIG. 4 are performed, respectively. Thereafter, in step 708, the PoC server A stores a floor control scheme or an ID corresponding to the floor control scheme. That is, since the procedure of FIG. 7, differently from the procedure of FIG. 5, determines whether to apply a floor control scheme requested by the PoC client A to a PoC session by using an SDP response parameter, step 708 of storing the corresponding floor control scheme is required. Meanwhile, a floor control scheme for each session is mapped to a conference URI, which is an identifier of the session, in one-to-one correspondence so that the floor control scheme can be applied only to the corresponding session.

Thereafter, in step 710, the PoC server A transfers a session participation request message, which reports that a floor control scheme is offered, to a receiving-side PoC server B. Then, the receiving-side PoC server B transfers the session participation request message to a receiving-side PoC client B in step 712.

Next, the receiving-side PoC client B, having received the session participation request message including an offered floor control scheme, determines whether to accept the offered floor control scheme included in the session participation request message (step 714), and sends a final response message to the receiving-side PoC server B. Floor control scheme parameters included in the session participation request message (INVITE message), for example, "mbcs=round-robin" shown in FIG. 6, are based on a normal SDP offer/answer model. Therefore, when the receiving-side PoC client B transmits an OK response message not including a corresponding parameter, the PoC server A establishes a normal PoC session to which the offered floor control scheme is not applied. In contrast, when the receiving-side PoC client B transmits a 200 OK response message which includes the offered floor control scheme so as to accept the offered floor control scheme, the PoC server A establishes a PoC session to which the offered floor control scheme is applied.

When the receiving-side PoC client B transfers a response message (e.g., 200 OK message), which reports whether to accept the offered floor control scheme, to the PoC server A through the receiving-side PoC server B in steps 716 and 718, the PoC server A performs a procedure of applying a negotiated floor control scheme in step 720. That is, the PoC server A checks the response message transferred from the receiving-side PoC client B, and applies the offered floor control scheme to the corresponding PoC session if the response message received from the receiving-side PoC client B refers to a message of accepting the offered floor control scheme. In contrast, if the response message received from the receiving-side PoC client B refers to a message of rejecting the offered floor control scheme, the PoC server A applies a normal floor control scheme to the corresponding PoC session. Then, in step 722, the PoC server A transfers a final response message including a floor control scheme, which will be applied to the corresponding PoC session, to the PoC client A, thereby completing a multimedia PoC session establishment procedure.

After the PoC session establishment has been completed, the PoC server A may grant a floor to the PoC client A based on a corresponding floor control scheme, and then the PoC client A may transfer media to the receiving-side PoC client B (steps 724 to 732).

Figure 7:
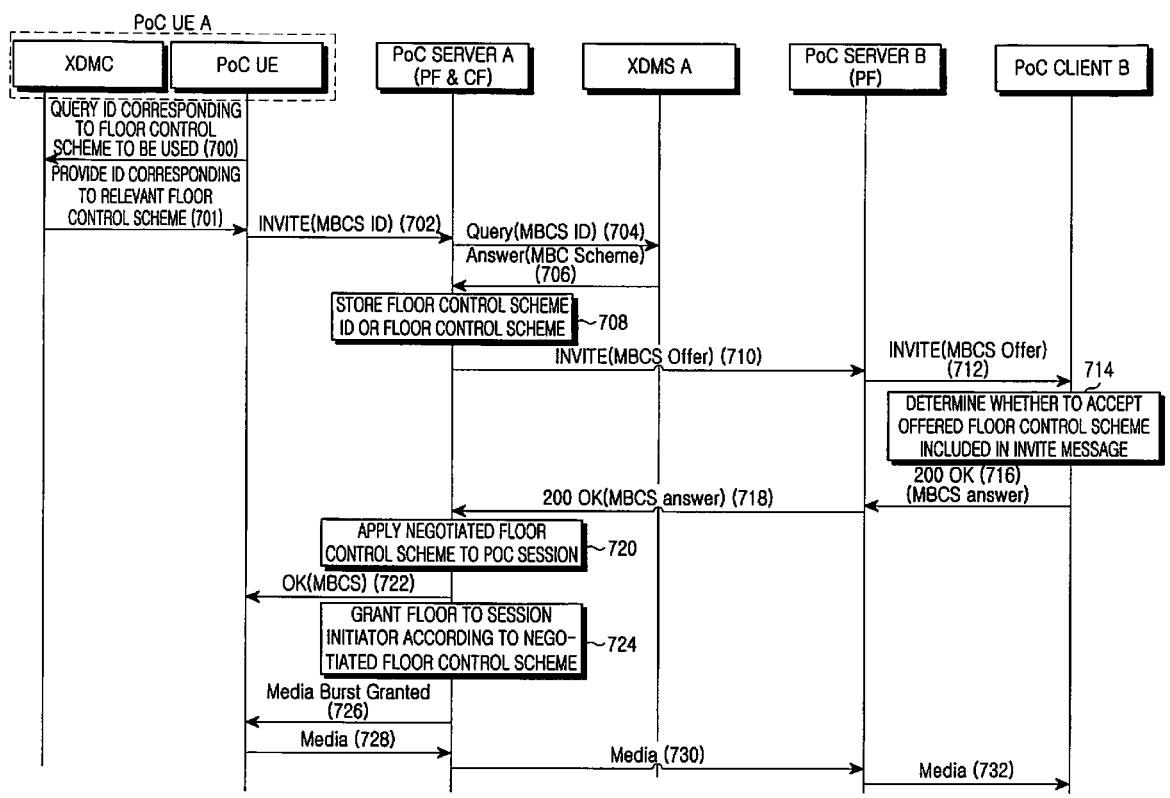
FIG. 7 illustrates the signal flow for applying a floor control scheme according to a session negotiation procedure according to the present invention.

The session establishment procedure described with reference to FIG. 7 is more suitable when a session for a PoC client supporting only a basic floor control scheme is established and when a one-to-one PoC session is established.

As described above, according to the present invention, when a PoC client performing an OMA PoC multimedia communication service establishes a PoC multimedia session, the PoC client transfers a floor control scheme desired to be used by the PoC client in the PoC session together with a session participation request message, so that it is possible to negotiate a floor control scheme to be applied to the PoC session while the PoC session is being established. Accordingly, a floor control scheme desired by a PoC client that initiates a session can be applied to the session, and a PoC client not supporting the floor control scheme cannot participate in the session. In addition, it is possible to manage a list of floor control schemes in cooperation with a PoC XDMC and a XDMS at all times.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A user equipment for transferring and applying a media burst control scheme in a Push-To-Talk (PTT) over Cellular (PoC) session, the user equipment comprising:
   a PoC Extensible Markup Language (XML) Document Management Client (XDMC) for storing Media Burst Control Schemes (MBCSs) applicable to a PoC session; and
   a PoC client for determining at least one MBCS desired by a user for use in the PoC session from the XDMC, and transmitting a session participation request message including the determined MBCS to a PoC server;
   wherein the XDMC and the PoC client are located at the user equipment.

2. The user equipment as claimed in claim 1, wherein the PoC client further queries the XDMC on the determined MBCS to be used in the PoC session through an internal interface.

3. The user equipment as claimed in claim 2, wherein the XDMC further provides an MBCS IDentity (ID) corresponding to the determined MBCS to the PoC client.

4. The user equipment as claimed in claim 3, wherein the PoC client further stores the MBCS ID received from the XDMC and establishes the determined MBCS corresponding to the received MBCS ID.

5. The user equipment as claimed in claim 1, wherein the MBCSs stored in the user equipment are shared with an XML Document Management Server (XDMS) by using an HTTP PUT message.

6. The user equipment as claimed in claim 1, wherein the user equipment further composes a new MBCS in form of an XML document by utilizing a function of the XDMC.

7. The user equipment as claimed in claim 6, wherein the composed MBCS further includes an MBCS applicable to a temporary PoC session and an application unique ID representing that the composed XML document refers to the MBCS.

8. The user equipment as claimed in claim 1, wherein the user equipment further receives a response message from the PoC server that represents acceptance of the determined MBCS by a receiving-side PoC client, the response message including the determined MBCS to be applied to the PoC session by the user equipment.

9. The user equipment as claimed in claim 8, wherein the receiving-side PoC client receives a session participation request message including a parameter representing that a certain MBCS is offered by a session initiation request PoC user equipment from the PoC server, determines whether to accept the certain MBCS and transmits a response message according to acceptance or rejection of the certain MBCS to the PoC server.

10. A Push-To-Talk (PTT) over Cellular (PoC) sever for transferring and applying a floor control scheme in PoC session, the PoC sever comprising:
a Participating PoC function (PF) unit; and
a Controlling PoC function (CF) unit for receiving, from a transmitting-side PoC client, a session participation request message including at least one Media Burst Control Scheme (MBCS) to be used in a PoC session when the PoC session is established between the transmitting-side PoC client and a receiving-side PoC client, seeking a detailed MBCS stored in an XML Document Management Server (XMDS) corresponding to the at least one MBCS, and applying a detailed MBCS sought from the XMDS for the PoC session if the XMDS includes information corresponding to the at least one MBCS.

11. The PoC server as claimed in claim 10, wherein the CF unit transfers a session participation request message including the detailed MBCS applied for the PoC session to the receiving-side PoC client.

12. The PoC server as claimed in claim 10, wherein the CF unit transfers a session participation request message including the detailed MBCS sought from the XMDS to the receiving-side PoC client.

13. The PoC server as claimed in claim 10, wherein the session participation request message includes an MBCS IDentity (ID) corresponding to the at least one MBCS,
wherein the CF unit queries the XDMS on the detailed MBCS corresponding to the MBCS ID, receives the detailed MBCS from the XDMS, and stores the detailed MBCS.

14. The PoC server as claimed in claim 13, wherein the CF unit applies the detailed MBCS for the PoC session, and then transfers the session participation request message including the detailed MBCS applied for the PoC session to the receiving-side PoC client.

15. The PoC server as claimed in claim 13, wherein the CF unit transfers a session participation request message including the detailed MBCS sought from the XMDS to the receiving-side PoC client, receives a response message according to acceptance or rejection of the detailed MBCS from the receiving-side PoC client, checks the response message, and applies the detailed MBCS to the PoC session if the response message accepts the detailed MBCS.

16. The PoC server as claimed in claim 15, wherein the CF unit applies a normal floor control scheme to the PoC session if the response message rejects the detailed MBCS.

17. The PoC server as claimed in claim 10, wherein the XDMS is located at the PoC server.

18. A user equipment method for transferring and applying a media burst control scheme in a Push-To-Talk (PTT) over Cellular (PoC) session, the method comprising the steps of:
determining, by a PoC client, at least one Media Burst Control Scheme (MBCS) desired by a user for use in the PoC session from MBCSs applicable to a PoC session stored in a PoC Extensible Markup Language (XML) Document Management Client (XDMC); and
transmitting, by the PoC client, a session participation request message including the determined MBCS to a PoC server;
wherein the PoC client and the XDMC are located at the user equipment.

19. The method as claimed in claim 18, wherein the determining step further comprises:
querying, by the PoC client, the XDMC on the determined MBCS to be used in the PoC session through an internal interface.

20. The method as claimed in claim 19, wherein the determining step further comprises:
providing, by the XDMC, an MBCS IDentity (ID) corresponding to the determined MBCS to the PoC client.

21. The method as claimed in claim 20, wherein the determining step further comprises:
storing, by the PoC client, the MBCS ID received from the XDMC; and
establishing, by the PoC client, the determined MBCS corresponding to the received MBCS ID.

22. The method as claimed in claim 18, wherein the MBCSs stored in the user equipment are shared with an XML Document Management Server (XDMS) by using an HTTP PUT message.

23. The method as claimed in claim 18, further comprising composing a new MBCS in form of an XML document by utilizing a function of the XDMC.

24. The method as claimed in claim 23, wherein the composed MBCS further includes an MBCS applicable to a temporary PoC session and an application unique ID representing that the composed XML document refers to the MBCS.

25. The method as claimed in claim 18, further comprising receiving a response message from the PoC server that represents acceptance of the determined MBCS by a receiving-side PoC client, the response message including the determined MBCS to be applied to the PoC session by the user equipment.

26. The method as claimed in claim 25, wherein the receiving-side PoC client receives a session participation request message including a parameter representing that a certain MBCS is offered by a session initiation request PoC user equipment from the PoC server, determines whether to accept the certain MBCS and transmits a response message according to acceptance or rejection of the certain MBCS to the PoC server.

27. A Push-To-Talk (PTT) over Cellular (PoC) sever method for transferring and applying a floor control scheme in PoC session, the method comprising the steps of:
receiving, from a transmitting-side PoC client, a session participation request message including at least one Media Burst Control Scheme (MBCS) to be used in a PoC session when the PoC session is established between the transmitting-side PoC client and a receiving-side PoC client;

seeking a detailed MBCS stored in an XML Document Management Server (XMDS) corresponding to the at least one MBCS; and applying a detailed MBCS sought from the XMDS for the PoC session if the XMDS includes information corresponding to the at least one MBCS.

28. The method as claimed in claim 27, further comprising transferring a session participation request message including the detailed MBCS applied for the PoC session to the receiving-side PoC client.

29. The method as claimed in claim 27, further comprising transferring a session participation request message including the detailed MBCS sought from the XMDS to the receiving-side PoC client.

30. The method as claimed in claim 27, wherein the session participation request message includes an MBCS IDentity (ID) corresponding to the at least one MBCS, and wherein the seeking step further comprises:
querying the XDMS on the detailed MBCS corresponding to the MBCS ID,
receiving the detailed MBCS from the XDMS, and
storing the detailed MBCS.

31. The method as claimed in claim 30, wherein the applying step further comprises:

applying the detailed MBCS for the PoC session, and
transferring the session participation request message including the detailed MBCS applied for the PoC session to the receiving-side PoC client.

32. The method as claimed in claim 30, wherein the applying step further comprises:

transferring a session participation request message including the detailed MBCS sought from the XMDS to the receiving-side PoC client,
receiving a response message according to acceptance or rejection of the detailed MBCS from the receiving-side PoC client,
checking the response message, and
applying the detailed MBCS to the PoC session if the response message accepts the detailed MBCS.

33. The method as claimed in claim 32, wherein the applying step further comprises applying a normal floor control scheme to the PoC session if the response message rejects the detailed MBCS.

34. The method as claimed in claim 27, wherein the XDMS is located at the PoC server.

* * * * *